(12) United States Patent
Matsumoto et al.

(10) Patent No.: US 11,654,764 B2
(45) Date of Patent: May 23, 2023

(54) VIBRATION-DAMPING DEVICE BODY AND VIBRATION-DAMPING DEVICE

(71) Applicant: Prospira Corporation, Kawasaki (JP)

(72) Inventors: Yoshinori Matsumoto, Tokyo (JP); Fumiaki Arie, Tokyo (JP)

(73) Assignee: Prospira Corporation, Kawasaki (JP)

( * ) Notice: Subject to any disclaimer, the term of this patent is extended or adjusted under 35 U.S.C. 154(b) by 461 days.

(21) Appl. No.: 16/330,569

(22) PCT Filed: Jun. 16, 2017

(86) PCT No.: PCT/JP2017/022262
§ 371 (c)(1),
(2) Date: Mar. 5, 2019

(87) PCT Pub. No.: WO2018/047431
PCT Pub. Date: Mar. 15, 2018

(65) Prior Publication Data
US 2021/0283966 A1    Sep. 16, 2021

(30) Foreign Application Priority Data
Sep. 8, 2016 (JP) .............................. JP2016-175723

(51) Int. Cl.
*B60K 5/12* (2006.01)
*B60G 13/00* (2006.01)
(Continued)

(52) U.S. Cl.
CPC .......... *B60K 5/1208* (2013.01); *B60G 13/001* (2013.01); *B60G 2204/12* (2013.01);
(Continued)

(58) Field of Classification Search
CPC .............. B60G 13/001; B60G 2204/41; B60G 2204/12; B60G 2204/43; F16F 13/08; F16F 13/103; B60K 5/1208
See application file for complete search history.

(56) References Cited

U.S. PATENT DOCUMENTS 5,050,702 A    9/1991 Sauer
2006/0091594 A1    5/2006 Miyahara
(Continued)

FOREIGN PATENT DOCUMENTS

CN    1769736 A    5/2006
CN    101305205 A    11/2008
(Continued)

OTHER PUBLICATIONS

Communication dated Sep. 16, 2019 from the European Patent Office in application No. 17848376.4.
(Continued)

*Primary Examiner* — James M Dolak
*Assistant Examiner* — Daniel M. Keck
(74) *Attorney, Agent, or Firm* — Kenja IP Law PC (57) ABSTRACT

A vibration-damping device body (10) is provided that includes a first mounting member (11) mounted on one of a vibration-generating portion and a vibration-receiving portion via a bracket (2), a second mounting member (12) mounted on the other of the vibration-generating portion and the vibration-receiving portion, and an elastic body (13) connecting the first mounting member (11) and the second mounting member (12). The first mounting member (11) is fitted into a fitting hole (2a) formed in the bracket (2). A first guide portion (30) is formed on an outer circumferential surface of the first mounting member (11). A second guide portion (20 is formed on an inner circumferential surface of the fitting hole (2a). The first guide portion (30) is fitted into
(Continued)

the second guide portion (2f). The first mounting member (11) is formed of a synthetic resin material, and a metal fitting (40) having first engagement surfaces (42a) coming into contact with the second guide portion (2f) is arranged on the first guide portios (30).

13 Claims, 5 Drawing Sheets (51) Int. Cl.
    *F16F 1/38*     (2006.01)
    *F16F 13/10*    (2006.01)
(52) U.S. Cl.
    CPC ...... *B60G 2204/18* (2013.01); *B60G 2204/41* (2013.01); *B60G 2204/43* (2013.01)

(56) References Cited

U.S. PATENT DOCUMENTS

| | | |
|---|---|---|
| 2007/0178258 A1 | 8/2007 | Petit et al. |
| 2009/0008195 A1 | 1/2009 | Ueki |
| 2011/0291335 A1 | 12/2011 | Rooke |
| 2012/0318951 A1 | 12/2012 | Hermann et al. |
| 2015/0252866 A1 | 9/2015 | Muraoka et al. |
| 2016/0238102 A1 | 8/2016 | Goto et al. |
| 2017/0299008 A1 | 10/2017 | Satou et al. |
| 2017/0341500 A1* | 11/2017 | Oki ........................ F16F 1/3605 |

FOREIGN PATENT DOCUMENTS

| | | | |
|---|---|---|---|
| CN | 101889151 A | 11/2010 | |
| CN | 107076253 A | 8/2017 | |
| EP | 0 384 111 A3 | 9/1990 | |
| JP | 2007-205571 A | 8/2007 | |
| JP | 2011-214634 A | 10/2011 | |
| JP | 2013-117258 A | 6/2013 | |
| JP | 2018155284 A * | 10/2018 | ........... B60K 5/1208 |
| WO | 2015/037366 A1 | 3/2015 | |
| WO | 2016/092917 A1 | 6/2016 | |

OTHER PUBLICATIONS

International Search Report of PCT/JP2017/022262 dated Aug. 22, 2017.

Search Report dated Mar. 4, 2020, from the China National Intellectual Property Administration in No. 201780054802.2.

\* cited by examiner

VIBRATION-DAMPING DEVICE BODY AND VIBRATION-DAMPING DEVICE

TECHNICAL FIELD

The present invention relates to a vibration-damping device body and a vibration-damping device. Priority is claimed on Japanese Patent Application No. 2016-175723, filed Sep. 8, 2016, the content of which is incorporated herein by reference.

BACKGROUND ART

A vibration-damping device is known that includes a bracket mounted on one of a vibration-generating portion and a vibration-receiving portion, a mounting member mounted on the other of the vibration-generating portion and the vibration-receiving portion, and an elastic body connecting the bracket and the mounting member as disclosed in, for example, Patent Document 1 below. In addition, a vibration-damping device is also known that includes a first mounting member mounted on one of a vibration-generating portion and a vibration-receiving portion via a bracket, a second mounting member mounted on the other of the vibration-generating portion and the vibration-receiving portion, and an elastic body connecting the first mounting member and the second mounting member, wherein the first mounting member is fitted into a fitting hole formed in the bracket.

CITATION LIST

Patent Document

[Patent Document 1]
Japanese Unexamined Patent Application, First Publication No. 2011-214634

SUMMARY OF INVENTION

Technical Problem

However, in the latter vibration-damping device, when the first mounting member is formed of a synthetic resin material to reduce weight, a problem occurs in that rigidity is lowered in comparison with, for example, a metal material. Thereby, the first mounting member may be easily deformed, and fitting strength of the first mounting member into the fitting hole may be reduced. The first mounting member may be easily displaced from the bracket.

The present invention was made in view of the above circumstances, and is directed to providing a vibration-damping device body and a vibration-damping device capable of inhibiting a first mounting member from being displaced from a bracket and reducing weight.

Solution to Problem

To solve the problem, the present invention suggests the following means. An aspect of the present invention is a vibration-damping device body that includes: a first mounting member mounted on one of a vibration-generating portion and a vibration-receiving portion via a bracket; a second mounting member mounted on the other of the vibration-generating portion and the vibration-receiving portion; and an elastic body connecting the first mounting member and the second mounting member. The first mounting member is fitted into a fitting hole formed in the bracket. First guide portions, each of which has one of a projected shape and a recessed shape extending in a first axial direction along a central axis of the fitting hole, are formed on an outer circumferential surface of the first mounting member, and second guide portions, each of which has the other of the projected shape and the recessed shape extending in the first axial direction, are formed on an inner circumferential surface of the fitting hole. The first guide portions are fitted to the second guide portions, and the first mounting member is formed of a synthetic resin material. Metal fittings having first engagement surfaces coming into contact with the second guide portions are arranged on the first guide portions.

Advantageous Effects of Invention

According to the present invention, the first mounting member can be inhibited from being displaced from the bracket, and weight can be reduced.

DESCRIPTION OF EMBODIMENTS

Figure 1:
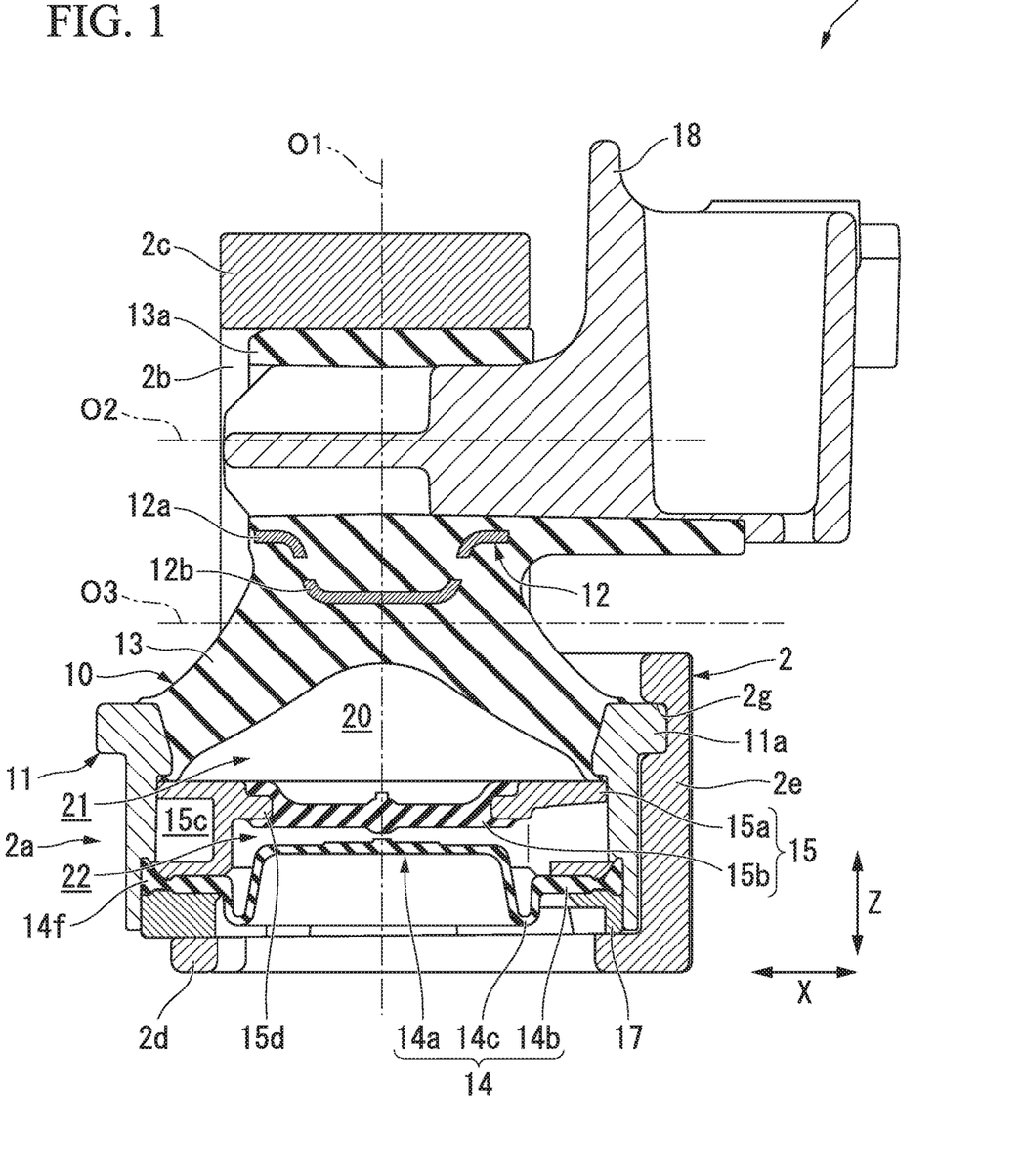
FIG. 1 is a longitudinal sectional view of a vibration-damping device according to an embodiment of the present invention.

Hereinafter, a vibration-damping device body 10 and a vibration-damping device 1 according to the present embodiment will be described with reference to the drawings. The vibration-damping device 1 of the present embodiment is used as, for example, a suspension bushing for a car, an engine mount, or a mount of an industrial machine installed in a factory. As illustrated in FIG. 1, the vibration-damping device 1 includes a bracket 2 that is mounted on any one of a vibration-generating portion (e.g., an engine or the like) and a vibration-receiving portion (e.g., a car body or the like), and a vibration-damping device body 10 that is mounted in a fitting hole 2a formed in the bracket 2. The vibration-damping device body 10 includes a first mounting member 11 that is mounted on one of the vibration-generating portion and the vibration-receiving portion via the bracket 2, a second mounting member 12 that is mounted on the other of the vibration-generating portion and the vibration-receiving portion, and an elastic body 13 that connects the first mounting member 11 and the second mounting member 12. The first mounting member 11 is fitted into the fitting hole 2a of the bracket 2.

Each of the first mounting member 11 and the elastic body 13 is formed in a cylindrical shape. The elastic body 13 is disposed coaxially with a central axis O1 of the first mounting member 11. The second mounting member 12 is disposed away from the first mounting member 11 on one side thereof in a direction along the central axis O1. Hereinafter, the direction along the central axis O1 is referred to as an upward/downward direction Z. In the top view from the upward/downward direction Z, a direction perpendicular to the central axis O1 is referred to as a radial direction, and a direction around the central axis O1 is referred to as a circumferential direction.

The first mounting member 11 is formed of a synthetic resin material, and is connected to the elastic body 13. A lower end of the elastic body 13 is connected to an upper end of the first mounting member 11. The elastic body 13 is formed of a rubber material, and is adhered to the first mounting member 11 by vulcanization. A flange 11a protruding outward in the radial direction is formed at the upper end of the first mounting member 11. An upper surface of the flange 11a is flush with an edge of an upper end opening of the first mounting member 11.

The upper end opening of the first mounting member 11 is blocked by the elastic body 13, and a lower end opening thereof is blocked by a diaphragm 14. The diaphragm 14 is formed of, for example, a rubber material or the like. A liquid chamber 20 filled with a liquid such as ethylene glycol or water is defined by an inner circumferential surface of the first mounting member 11, an inner circumferential surface of the elastic body 13 and an upper surface of the diaphragm 14. A partition member 15 that partitions the liquid chamber 20 into a main liquid chamber 21 having the elastic body 13 as a part of a partition and a sub-liquid chamber 22 having the diaphragm 14 as a part of the partition is arranged in the liquid chamber 20. The partition member 15 includes a partition member body 15a that is fitted in the first mounting member 11 and is formed in an annular shape, and a membrane 15b that is mounted on the partition member body 15a. The partition member body 15a is disposed coaxially with the central axis O1.

A limiting passage 15c that causes the main liquid chamber 21 and the sub-liquid chamber 22 to communicate with each other and a mount 15d on which an elastically deformable membrane 15b is mounted are formed in the partition member body 15a. The limiting passage 15c is formed in an outer circumferential surface of the partition member body 15a, and extends in the circumferential direction. One of opposite circumferential ends of the limiting passage 15c opens upward and communicates with the main liquid chamber 21, and the other opens inward in the radial direction and communicates with the sub-liquid chamber 22. The mount 15d protrudes inward from an inner circumferential surface of the partition member body 15a in the radial direction, and continues to extend over the entire circumference. The membrane 15b is adhered to not only the mount 15d but also a portion located above the mount 15d within the inner circumferential surface of the partition member body 15a by vulcanization.

The diaphragm 14 includes a main body 14a that is formed in a topped tubular shape, an annular fixture 14b that is fixed to a fixing ring 17 (to be described below) inside the first mounting member 11, and an annular connector 14c that connects the main body 14a and the fixture 14b. The main body 14a, the fixture 14b, and the connector 14c are arranged coaxially with the central axis O1. The diaphragm 14 has a circular shape in a top view. A top wall of the main body 14a is formed in a circular shape, and a circumferential wall thereof is gradually reduced in diameter upward. A lower end of the circumferential wall of the main body 14a is connected to an inner end of the connector 14c in the radial direction.

The connector 14c is curved to protrude downward. An outer end of the connector 14c in the radial direction is connected to an inner end of the fixture 14b in the radial direction. The fixture 14b is formed in an annular disk shape. An upper surface of the fixture 14b comes into contact with a lower surface of the partition member body 15a. A protrusion 14f protruding upward continues to extend at an outer circumferential edge of the fixture 14b over the entire circumference. The protrusion 14f is disposed outside the partition member body 15a in the radial direction. The protrusion 14f is interposed between the inner circumferential surface of the first mounting member 11 and the outer circumferential surface of the partition member body 15a in the radial direction. The fixing ring 17 is formed of a synthetic resin material. A lower surface of the fixture 14b comes into contact with an upper surface of the fixing ring 17. The fixing ring 17 is fitted into a lower end of the first mounting member 11.

The second mounting member 12 is formed in a tubular shape in which a central axis O2 thereof extends in one radial direction (a first axial direction). Hereinafter, the one direction is referred to as a leftward/rightward direction X, and a direction perpendicular to both of the leftward/rightward direction X and the upward/downward direction Z is referred to as a forward/backward direction Y. The upward/downward direction Z, the leftward/rightward direction X, and the forward/backward direction Y correspond to directions in a vehicle in which the vibration-damping device 1 is mounted.

The second mounting member 12 has a rectangular shape when viewed in the leftward/rightward direction X. The second mounting member 12 is formed by bending a belt-like sheet metal to have a rectangular tubular shape centered on the central axis O2, and opposite end edges thereof in a longitudinal direction come into contact with or close to each other. A bowl-shaped swell 12b that swells downward is formed on a lower circumferential wall 12a of a circumferential wall of the second mounting member 12, wherein the lower circumferential wall 12a is directed in the upward/downward direction Z and is located downward. The swell 12b is disposed coaxially with the central axis O1. An inner circumferential surface of the swell 12b is gradually increased in diameter upward.

In the state in which the second mounting member 12 is disposed to be located inside the first mounting member 11 in the radial direction, the entirety of the second mounting member 12 is embedded in the elastic body 13. A plurality of through-holes, which open in the radial direction, are formed in the swell 12b at intervals in the circumferential direction. A connecting plate 18 connected to the other of the vibration-generating portion and the vibration-receiving portion is pressed inside the second mounting member 12.

Figure 2:
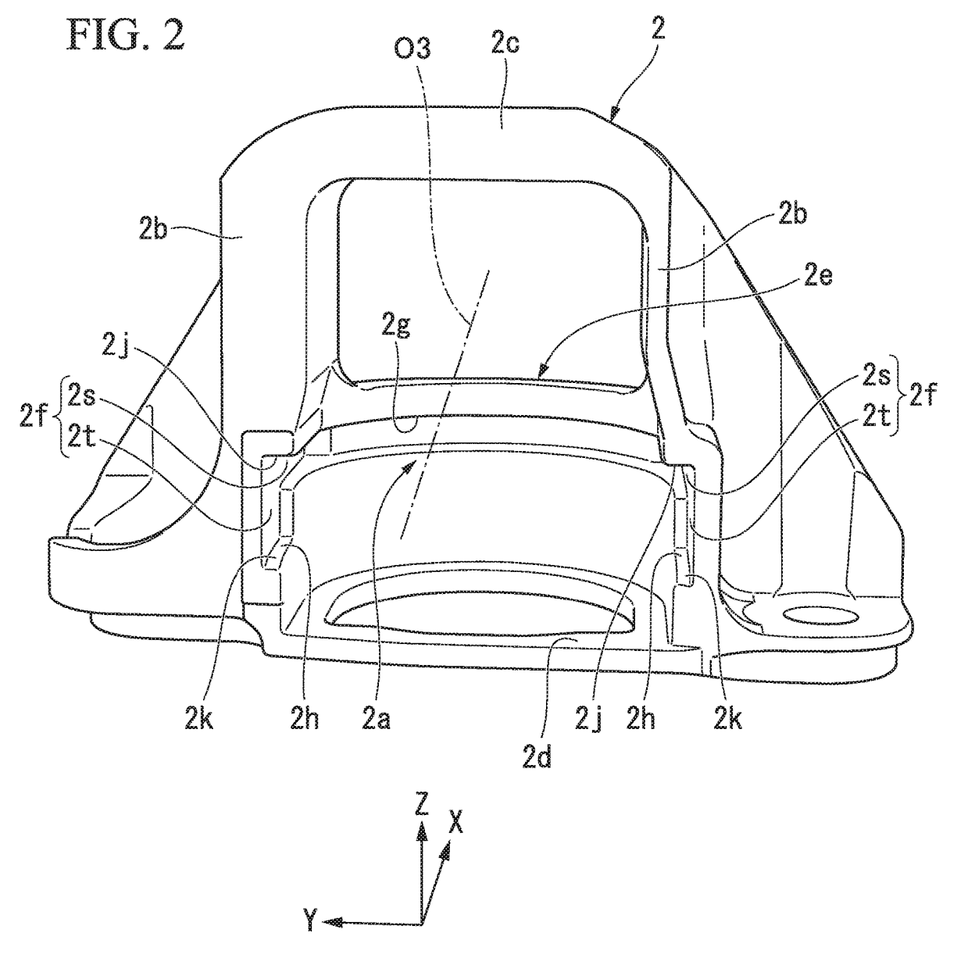
FIG. 2 is a perspective view of a bracket illustrated in FIG. 1.

As illustrated in FIG. 2, the fitting hole 2a, which opens in the leftward/rightward direction X, is formed in the bracket 2. The bracket 2 is formed in a rectangular tubular shape that opens in the leftward/rightward direction X. In the shown example, when viewed in the leftward/rightward direction X, the bracket 2 has a rectangular shape that is long in the upward/downward direction Z and is short in the forward/backward direction Y. The inside of the bracket 2 is the fitting hole 2a. The bracket 2 is integrally formed of the same material by casting.

The bracket 2 includes a pair of sidewalls 2b whose front and back surfaces are directed in the forward/backward direction Y, a top wall 2c whose front and back surfaces are directed in the upward/downward direction Z and which connects upper ends of the pair of sidewalls 2b, and a bottom wall 2d whose front and back surfaces are directed in the upward/downward direction Z and which connects lower ends of the pair of sidewalls 2b. The bottom wall 2d is formed in an annular shape that opens in the upward/downward direction Z.

A covering 2e, which covers an opening of one side of the fitting hole 2a in the leftward/rightward direction X, is formed on the bracket 2. In the state in which the vibration-damping device 1 is mounted in a vehicle, one side in the leftward/rightward direction X is the left side of the vehicle, and the other side in the leftward/rightward direction X is the right side of the vehicle. The covering 2e connects lower portions of the pair of sidewalls 2b, and covers a lower portion of the opening of one side in the leftward/rightward direction X in the fitting hole 2a.

The covering 2e has a curved shape that protrudes toward one side in the leftward/rightward direction X, and projects to one side in the leftward/rightward direction X relative to the pair of sidewalls 2b as illustrated in FIG. 1. The covering 2e may not be formed. Here, the second mounting member 12 is located above the covering 2e, and the aforementioned connecting plate 18 protrudes from the fitting hole 2a of the bracket 2 to one side in the leftward/rightward direction X. A protruding portion of the connecting plate 18 which protrudes from the fitting hole 2a of the bracket 2 to one side in the leftward/rightward direction X and an end face of one side in the leftward/rightward direction X in the bracket 2 face each other in the leftward/rightward direction X.

A rubber stopper 13a is arranged between the protruding portion of the connecting plate 18 and the end face of the bracket 2. An upper end of the elastic body 13 comes into contact with a lower surface of the top wall 2c of the bracket 2. The rubber stopper 13a is formed integrally with the elastic body 13.

Figure 3:
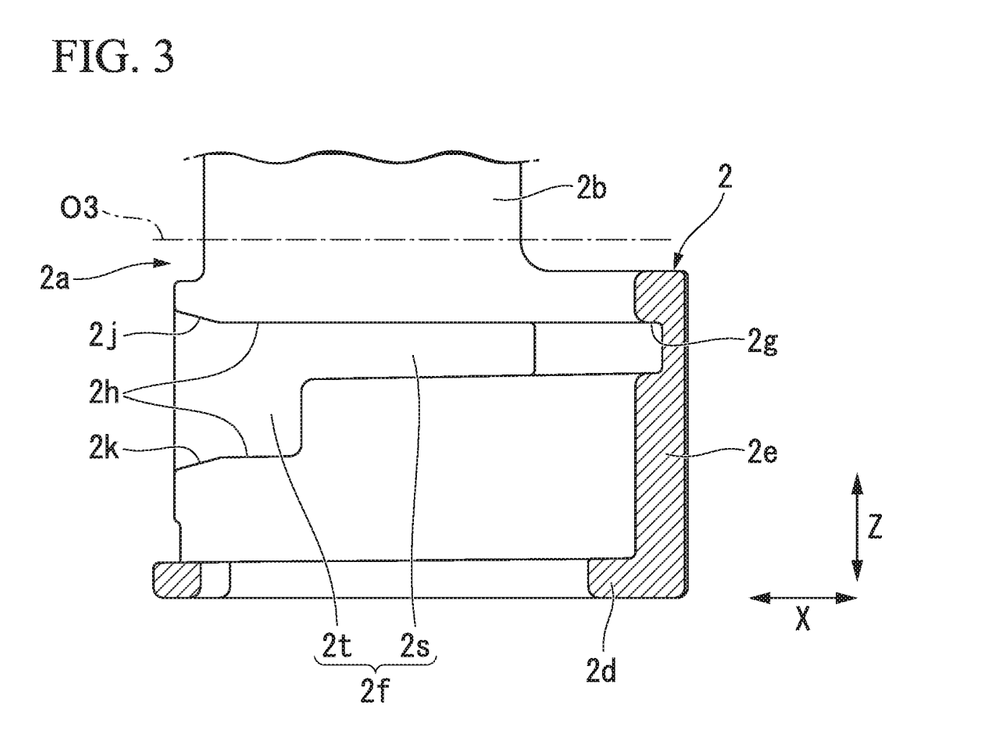
FIG. 3 is a longitudinal sectional view of key parts of the bracket illustrated in FIG. 1.

As illustrated in FIGS. 2 and 3, recessed second guide portion 2f, which extend in the leftward/rightward direction X, are formed on an inner circumferential surface of the fitting hole 2a. The second guide portions 2f are separately formed on the pair of sidewalls 2b. The second guide portion 2f includes a first groove 2s located on one side thereof in the leftward/rightward direction X and a second groove 2t located on the other side thereof in the leftward/rightward direction X. As illustrated in FIG. 3, the first groove 2s is formed in a rectangular shape that extends in the leftward/rightward direction X. When viewed in the forward/backward direction Y, the second groove 2t has a rectangular shape that is long in the upward/downward direction Z and is short in the leftward/rightward direction X.

The first groove 2s is formed such that a size thereof in a direction along an outer circumferential surface of the first mounting member 11 of directions perpendicular to the leftward/rightward direction X is smaller than the second groove 2t. In the shown example, the first groove 2s is formed such that a size thereof in the upward/downward direction Z is smaller than the second groove 2t. An upper surface, which is located upward and faces downward, among the inner surfaces by which each of the second guide portions 2f is defined has a level position in the upward/downward direction Z over the entire area excluding an end 2j of the other side of the upper surface in the leftward/rightward direction X.

On a lower surface, which is located downward and faces upward, among the inner surfaces by which the second guide portion 2f is defined, a lower surface of the second groove 2t projects below a lower surface of the first groove 2s. The upper and lower surfaces of the second groove 2t are second engagement surfaces 2h that come into contact with first engagement surfaces 42a of each metal fitting 40. The first engagement surfaces 42a may be portions excluding ends 2j and 2k of the upper and lower surfaces of the second groove 2t on the other side thereof in the leftward/rightward direction X.

The end 2j of the upper surface of the second groove 2t on the other side thereof in the leftward/rightward direction X gradually extends upward toward the other side in the leftward/rightward direction X. The end 2k of the lower surface of the second groove 2t on the other side thereof in the leftward/rightward direction X gradually extends downward toward the other side in the leftward/rightward direction X. Thereby, sizes, that is, groove widths, of the second guide portions 2f in the upward/downward direction Z are largest at the ends of the second grooves 2t on the other side thereof in the leftward/rightward direction X.

A connection groove 2g, which has a curvilinear shape protruding toward one side in the leftward/rightward direction X and extends in the forward/backward direction Y, is formed in an inner surface, that faces the other side in the leftward/rightward direction X, among surfaces of the covering 2e. Opposite ends of the connection groove 2g in the forward/backward direction Y are separately connected to ends of the pair of first grooves 2s on one side thereof in the leftward/rightward direction X. The connection groove 2g and the first grooves 2s are formed such that positions thereof in the upward/downward direction Z are the same and groove widths thereof are equal to each other. The groove width of the connection groove 2g is equal in size to the flange 11a of the first mounting member 11 in the upward/downward direction Z, and the flange 11a is fitted into the connection groove 2g.

Figure 4:
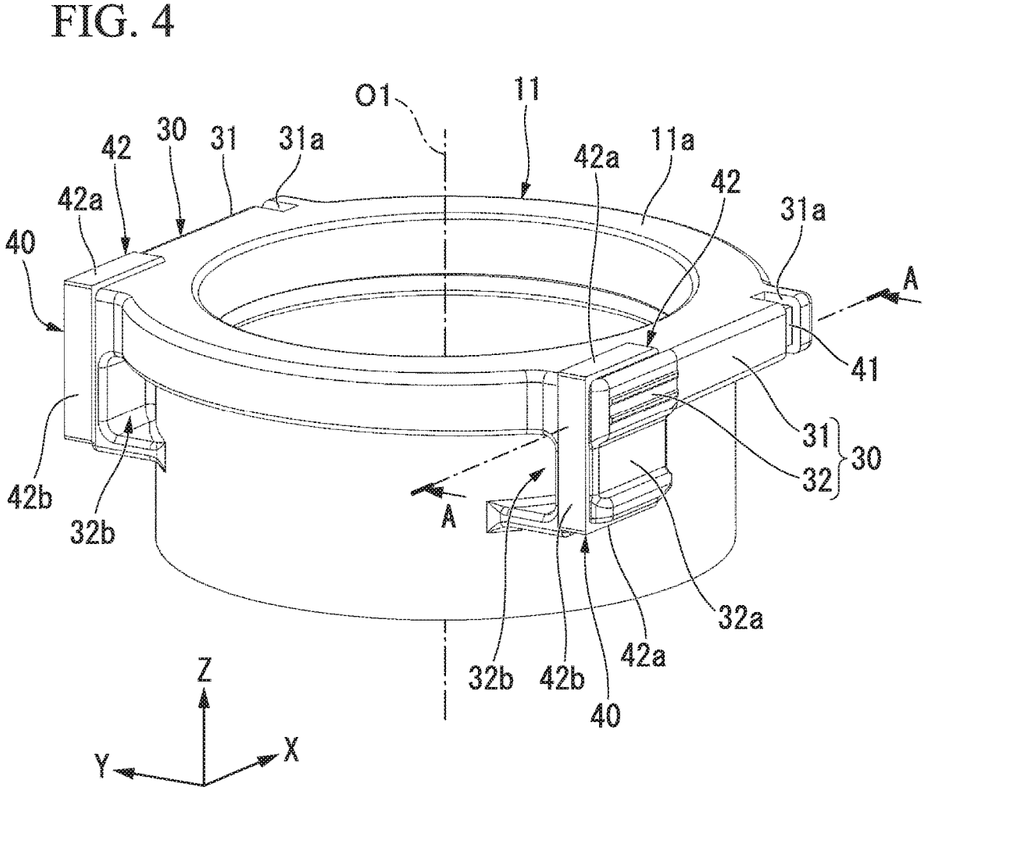
FIG. 4 is a perspective view of a first mounting member illustrated in FIG. 1.

In the present embodiment, as illustrated in FIG. 4, projected first guide portion 30, which extends in the leftward/rightward direction X, are formed on the outer circumferential surface of the first mounting member 11. In the top view, the first guide portion 30 protrudes outward from the outer circumferential surface of the first mounting member 11 in the forward/backward direction Y, and extends in tangent directions in which a tangent line is tangent to the outer circumferential surface of the first mounting member 11. The first guide portion 30 is formed such that the two first guide portions 30 are formed on the outer circumferential surface of the first mounting member 11 and are separately disposed on both sides sandwiching the central axis O1 in the radial direction. The first guide portion 30 is fitted into the second guide portion 2f of the fitting hole 2a.

The first guide portion 30 includes a first guide part 31 that is located on one side thereof in the leftward/rightward direction X, and a second guide part 32 that is located on the other side thereof in the leftward/rightward direction X. Upper surface of the first guide part 31 and upper surface of the second guide part 32 are flush with an upper surface of the flange 11a of the first mounting member 11. A size of the first guide part 31 in the upward/downward direction Z is equal in size to the flange 11a of the first mounting member 11 in the upward/downward direction Z. The first guide part 31 is formed in a rectangular shape that extends in the leftward/rightward direction X. A recess 31a, to which a part of the metal fitting 40 (to be described below) is exposed, is formed in an end of the first guide part 31 on one side thereof in the leftward/rightward direction X. The recess 31a integrally opens in three directions that are upward, downward, and outward in the forward/backward direction Y.

When viewed in the forward/backward direction Y, the second guide part 32 has a rectangular shape that is long in the upward/downward direction Z and is short in the leftward/rightward direction X. A first concave 32a, which extends over an entire length of the leftward/rightward direction X, is formed in a surface of the second guide part 32 which is directed in the forward/backward direction Y. The first concave 32a has a rectangular shape when viewed in the forward/backward direction Y. A size of the first concave 32a in the upward/downward direction Z is larger than sizes of portions located above and below the first concave 32a of the second guide part 32 in the upward/downward direction Z and a size of the first guide part 31 in the upward/downward direction Z. A second concave 32b recessed toward one side in the leftward/rightward direction X is formed in an end face of the second guide part 32 on the other side thereof in the leftward/rightward direction X. A part of an inner surface of the second concave 32b is the outer circumferential surface of the first mounting member 11, and a portion of the outer circumferential surface of the first mounting member 11, which is located inside the second concave 32b, continues to a portion located outside the second concave 32b without a step.

Figure 5:
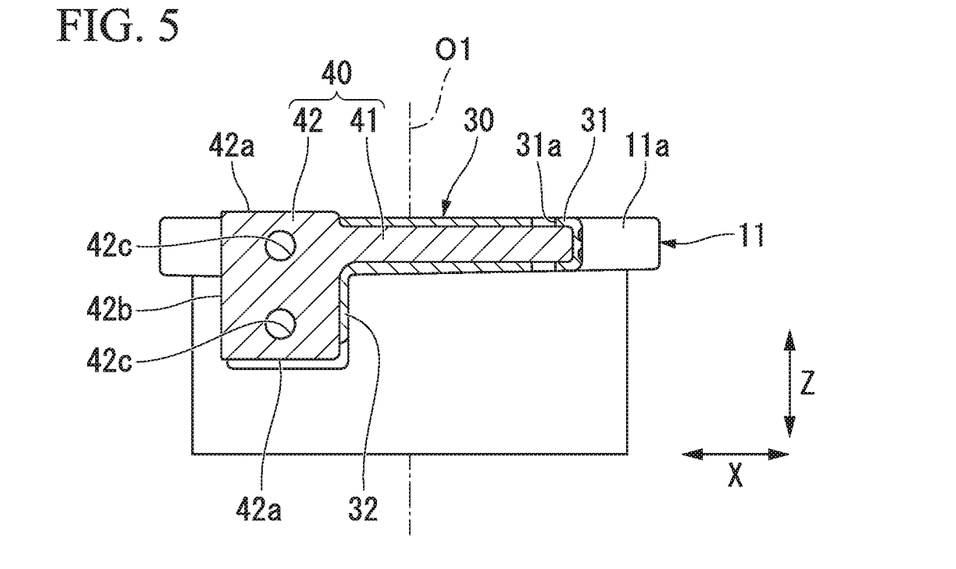
FIG. 5 is a sectional view taken along arrows A-A of the first mounting member illustrated in FIG. 4.

As illustrated in FIG. 5, a metal fitting 40, which has first engagement surfaces 42a abutting against the second guide portions 2f, is arranged on the first guide portions 30. In the shown example, the metal fitting 40 is embedded in the first guide portion 30. The metal fitting 40 is formed in a shape corresponding to contours of the first guide portion 30, and include an insertion part 41 that is located on one side of the metal fitting 40 in the leftward/rightward direction X and an engagement part 42 that is located on the other side of the metal fitting 40 in the leftward/rightward direction X. A size of the engagement part 42 in the upward/downward direction Z is larger than a size of the insertion part 41 in the upward/downward direction Z. The first mounting member 11 and the metal fitting 40 is integrally formed by insert molding. The metal fitting 40 may be arranged on the first guide portion 30 by adhesion.

The insertion part 41 is formed in a rectangular shape that extends in the leftward/rightward direction X. A size of the insertion part 41 in the upward/downward direction Z is equal over the entire area of the leftward/rightward direction X. An end of the insertion part 41 on one side thereof in the leftward/rightward direction X is exposed outside through the aforementioned recess 31a. In the recess 31a, a portion, which is separated from an end edge of the insertion part 41 in the leftward/rightward direction X to the other side in the leftward/rightward direction X, of the end of the insertion part 41 on one side thereof in the leftward/rightward direction X is exposed outside. An upper surface of the insertion part 41 is located below an upper surface of the engagement part 42.

As illustrated in FIG. 5, when viewed in the forward/backward direction Y, the engagement part 42 has a rectangular shape that is long in the upward/downward direction Z and is short in the leftward/rightward direction X. The engagement part 42 is embedded in the first guide portion 30 in the state in which an upper end, a lower end, and an end on the other side in the leftward/rightward direction X of the engagement part 42 are exposed outside from the first guide portion 30. The upper and lower surfaces of the engagement part 42 are first engagement surfaces 42a that come into contact with the second engagement surfaces 2h of the second guide portion 2f of the bracket 2. In the shown example, the first engagement surfaces 42a protrude above and below the first guide portion 30, and are directed in the upward/downward direction. An end face of the engagement part 42 on the other side thereof in the leftward/rightward direction X is a pressing surface 42b pressed when the first mounting member 11 is assembled to the bracket 2.

Upper and lower ends of the end of the engagement part 42 on one side thereof in the leftward/rightward direction X are chamfered in a curved shape. Two through-holes 42c penetrated in the forward/backward direction Y are formed in the engagement part 42 at an interval in the upward/downward direction Z. The metal fitting 40 is formed of, for example, an aluminium alloy or the like. A longitudinal elastic modulus of the material of which the metal fitting 40 is formed is smaller than that of the material of which the bracket 2 is formed.

Next, a method of assembling the vibration-damping device body 10 in the bracket 2 will be described. The vibration-damping device body 10 and the bracket 2 are relatively moved in the leftward/rightward direction X such that they approach each other, and the first guide part 31 of the first guide portion 30 on one side thereof in the leftward/rightward direction X are inserted into the second guide portion 2f from the ends of the second groove 2t on the other side thereof in the leftward/rightward direction X. The ends of the first engagement surfaces 42a of the metal fitting 40 on one side thereof in the leftward/rightward direction X are brought into contact with the ends of the second engagement surfaces 2h of the second guide portion 2f on the other side thereof in the leftward/rightward direction X.

The pressing surface 42b of the metal fitting 40 is pressed toward one side in the leftward/rightward direction X. Thereby, while the first engagement surfaces 42a of the metal fitting 40 and the second engagement surfaces 2h of the second guide portion 2f are sliding against each other, the vibration-damping device body 10 is inserted into the fitting hole 2a toward one side in the leftward/rightward direction X. Thereby, assembly of the vibration-damping device body 10 to the bracket 2 is completed. In this case, the flange 11a of the first mounting member 11 enters the connection groove 2g of the covering 2e in the bracket 2.

Here, in the process of inserting the vibration-damping device body 10 into the fitting hole 2a toward one side in the leftward/rightward direction X, the pressing surfaces 42b of the first mounting member 11 which is formed of not a synthetic resin material but a metal material are pressed against the bracket 2 toward one side in the leftward/rightward direction X. For this reason, even in the case where interference between the first engagement surfaces 42a of the metal fitting 40 and the second engagement surfaces 2h of the second guide portion 2f is increased, the first mounting member 11 can be inhibited from being greatly deformed.

As described above, according to the vibration-damping device body 10 of the present embodiment, the first mounting member 11 is formed of a synthetic resin material. Thereby, in comparison with the case where the entirety of the first mounting member 11 is formed of a metal material, the vibration-damping device 1 can be reduced in weight. The metal fitting 40 arranged on the first guide portion 30 of the first mounting member 11 has the first engagement surfaces 42a that come into contact with the inner surfaces of the second guide portions 2f, and the first engagement surfaces 42a have higher hardness than the first mounting member 11 formed of a synthetic resin material. Thereby, the first engagement surfaces 42a are difficult to be deformed, and thus the first engagement surfaces 42a can be strongly pressed against the second guide portions 2f of the fitting hole 2a. Accordingly, engagement between the first guide portion 30 and the second guide portion 2f can be strengthened, and fitting strength of the first mounting member 11 against the fitting hole 2a can also be inhibited from being reduced over time because the first engagement surfaces 42a are formed of a metal material. Thereby, displacement of the first mounting member 11 from of the fitting hole 2a of the bracket 2 can be inhibited.

Since the first engagement surfaces 42a are surfaces directed in the upward/downward direction Z, an especially great load such as, for example, the vibration-generating portion's own weight or the like is easily applied, and deformation of the first mounting member 11 against an external force in the upward/downward direction can be effectively suppressed. Thereby, the first mounting member 11 is formed of a synthetic resin material, so that easy displacement of the first mounting member 11 from the fitting hole 2a of the bracket 2 can be effectively suppressed.

The first engagement surfaces 42a are arranged on the second guide part 32, the size of which is larger in the upward/downward direction Z, of the first guide portion 30. Thereby, even if the first guide part 31, the size of which is smaller in the upward/downward direction Z, of the first guide portion 30 is loosely fitted into the second guide portion 2f, the fitting strength of the first mounting member 11 into the fitting hole 2a can be easily secured. In this case, in the process of fitting the first mounting member 11 into the fitting hole 2a, the first guide portion 30 is fitted into the second guide portion 2f from one portion of the first guide portion 30 in an initial stage, and the other portion of the first guide portion 30 is fitted into the second guide portion 2f in a final stage. Thereby, there is no need to apply a great force to the first mounting member 11 and the bracket 2 in the initial stage, and it is sufficient to apply a great force only in the final stage. In the final stage, the first guide part 31 of the first guide portion 30 are already inserted into the second guide portion 2f, and thus the second guide part 32 is not displaced from the second guide portion 2f. Thereby, work of fitting the first mounting member 11 into the fitting hole 2a can be easily performed.

According to the vibration-damping device 1 of the present embodiment, the surface of at least part of the second guide portion 2f is formed of a metal material, and is the second engagement surface 2h that comes into contact with the first engagement surface 42a. For this reason, the first engagement surface 42a and the second engagement surface 2h are brought into contact with each other, the engagement between the first guide portion 30 and the second guide portion 2f is reliably strengthened, and the fitting strength of the first mounting member 11 into the fitting hole 2a can be reliably inhibited from being reduced over time.

The longitudinal elastic modulus of the metal material of which the metal fitting 40 is formed is smaller than the longitudinal elastic modulus of the metal material of which the second engagement surfaces 2h are formed. For this reason, when the first guide portion 30 is fitted into the second guide portions 2f, the first engagement surfaces 42a are deformed. Thereby, even if the first engagement surfaces 42a and the second engagement surfaces 2h strongly come into contact with each other, application of an excessively great load to the second engagement surfaces 2h can be inhibited.

The first concave 32a is formed in the second guide part 32 of the first guide portion 30 which is tightly fitted into the second guide portion 2f in the forward/backward direction Y. Thereby, a surface pressure between the surface of the second guide part 32 which is directed in the forward/backward direction Y and the inner surface of the second guide portion 2f can be increased, and the occurrence of a partial gap between both the surfaces can be suppressed. Thereby, the occurrence of abnormal noise resulting from the fact that the second guide parts 32 are deformed by vibration input to the vibration-damping device 1 and partial gaps are crushed, can be prevented.

The technical scope of the present invention is not limited to the embodiment, and the present invention may be modified in various ways without departing from the spirit or teaching of the present invention. For example, the embodiment represents the constitution in which the projected first guide portion 30 is formed in the first mounting member 11 and the recessed second guide portion 2f are formed in the fitting hole 2a of the bracket 2, but it is not limited to this mode. The first guide portion of the first mounting member may be formed in recessed shapes, and the second guide portion of the bracket may be formed in projected shapes. In this case, the first engagement surfaces of the metal fitting come into contact with the outer surfaces of the second guide portion.

The embodiment represents the constitution in which the first engagement surfaces 42a of the metal fitting 40 are directed in the upward/downward direction Z, but it is not limited to this mode. The first engagement surfaces may be directed in a direction other than the upward/downward direction Z. In addition, the embodiment represents the constitution in which the size in the upward/downward direction Z, of the first guide part 31 of the first guide portion 30 located on one side thereof in the leftward/rightward direction X is smaller than the size in the upward/downward direction Z, of the second guide part 32 of the first guide portion 30 located on the other side thereof in the leftward/rightward direction X, but it is not limited to this mode. The size of the first guide part in the upward/downward direction Z may be equal to or greater than the size of the second guide part in the upward/downward direction Z.

The embodiment represents the constitution in which the longitudinal elastic modulus of the metal material of which the metal fitting 40 is formed is smaller than the longitudinal elastic modulus of the metal material of which the second engagement surfaces 2h in the second guide portion 2f of the bracket 2 are formed, but it is not limited to this mode. The longitudinal elastic modulus of the metal material of which the first engagement surfaces of the first mounting member are formed is equal to or greater than the longitudinal elastic modulus of the metal material of which the second engagement surfaces of the bracket are formed.

The embodiment represents the constitution in which the bracket 2 is formed by casting and the first mounting member 11 is formed by insert molding using a synthetic resin material, but it is not limited to this mode. Each of the bracket and the first mounting member may be formed by a different molding method using a different material. The embodiment represents the constitution in which the central axis O1 of the first mounting member 11 is perpendicular to the central axis O3 of the fitting hole 2a, but it is not limited to this mode. The first mounting member may be fitted into the fitting hole to be the same axis as the central axis of the fitting hole.

In addition, without departing from the scope of the present invention, the components in the aforementioned embodiment may be appropriately substituted with well-known components, and furthermore, the aforementioned embodiment may be appropriately combined with the aforementioned modification.

INDUSTRIAL APPLICABILITY

According to the present invention, the first mounting member can be inhibited from being displaced from the bracket, and can be reduced in weight.

REFERENCE SIGNS LIST

1 Vibration-damping device
2 Bracket

2a Fitting hole
2f Second guide portion
2h Second engagement surface
10 Vibration-damping device body
11 First mounting member
12 Second mounting member
13 Elastic body
30 First guide portion
42a First engagement surface
O1 Central axis of the first mounting member
O2 Central axis of the second mounting member
O3 Central axis of the fitting hole

The invention claimed is:

1. A vibration-damping device comprising:
a vibration-damping device body; and
a bracket,
wherein
the vibration-damping device body includes:
a first mounting member mounted on one of a vibration-generating portion and a vibration-receiving portion via the bracket;
a second mounting member mounted on the other of the vibration-generating portion and the vibration-receiving portion; and
an elastic body connecting the first mounting member and the second mounting member,
wherein
the first mounting member is fitted into a fitting hole formed in the bracket,
a first guide portion, which has one of a projected shape and a recessed shape extending in a first axial direction along a central axis of the fitting hole, is formed on an outer circumferential surface of the first mounting member,
a second guide portion, which has the other of the projected shape and the recessed shape extending in the first axial direction, is formed on an inner circumferential surface of the fitting hole of the bracket,
the first guide portion is fitted to the second guide portion,
the first mounting member is made entirely of a synthetic resin material,
a metal fitting having first engagement surfaces is arranged on the first guide portion,
second engagement surfaces are formed in the second guide portion,
the first mounting member includes:
a flange protruding outward in a radial direction; and
the first guide portion formed on an outer circumferential surface of the flange among the outer circumferential surface of the first mounting member,
the first engagement surfaces include:
a first surface facing in a first direction of a direction along the outer circumferential surface of the first mounting member among directions perpendicular to the first axial direction; and
a second surface facing in a second direction opposite to the first direction,
the second engagement surfaces includes:
a third surface facing in the second direction; and
a fourth surface facing in the first direction, wherein
the first surface comes into contact with the third surface,
the second surface comes into contact with the fourth surface,
the elastic body is connected to an inner circumferential surface of the first mounting member, and
the metal fitting is arranged outward in the radial direction of the first mounting member.

2. The vibration-damping device according to claim 1, wherein the direction along the outer circumferential surface of the first mounting member among the directions perpendicular to the first axial direction is an upward/downward direction.

3. The vibration-damping device according to claim 2, wherein:
a portion of the first guide portion on one side thereof in the first axial direction have a smaller size than that of a portion of the other side thereof in the first axial direction, the size being in the direction along the outer circumferential surface of the first mounting member among the directions perpendicular to the first axial direction; and
the first engagement surfaces are arranged on the portion of the first guide portion on the other side of the first guide portion.

4. The vibration-damping device according to claim 3, wherein the second engagement surface is a surface of at least a part of the second guide portions and is formed of a metal material.

5. The vibration-damping device according to claim 4, wherein the metal material of which the metal fitting is formed has a smaller longitudinal elastic modulus than that of a metal material of which the second engagement surface is formed.

6. The vibration-damping device according to claim 2, wherein the second engagement surface is a surface of at least a part of the second guide portions and is formed of a metal material.

7. The vibration-damping device according to claim 6, wherein the metal material of which the metal fitting is formed has a smaller longitudinal elastic modulus than that of a metal material of which the second engagement surface is formed.

8. The vibration-damping device according to claim 1, wherein:
a portion of the first guide portion on one side thereof in the first axial direction have a smaller size than that of a portion of the first guide portion on the other side thereof in the first axial direction, the size being in the direction along the outer circumferential surface of the first mounting member among the directions perpendicular to the first axial direction; and
the first engagement surfaces are arranged on the portion of the first guide portion on the other side of the first guide portion.

9. The vibration-damping device according to claim 8, wherein the second engagement surface is a surface of at least a part of the second guide portions and is formed of a metal material.

10. The vibration-damping device according to claim 9, wherein the metal material of which the metal fitting is formed has a smaller longitudinal elastic modulus than that of a metal material of which the second engagement surface is formed.

11. A vibration-damping device according to claim 1, wherein the second engagement surface is a surface of at least a part of the second guide portion and is formed of a metal material.

12. The vibration-damping device according to claim 11, wherein the metal material of which the metal fitting is formed has a smaller longitudinal elastic modulus than that of a metal material of which the second engagement surface is formed.

13. The vibration-damping device according to claim 1, wherein the metal fitting is formed in a shape corresponding to contours of the first guide portion, and include an insertion part that is located on one side of the metal fitting in the first axial direction and an engagement part that is located on the other side of the metal fitting in the first axial direction, and a size of the engagement part is larger than a size of the insertion part in a direction along a central axis of the first mounting member.

* * * * *